United States Patent [19]
Barlow et al.

[11] Patent Number: 5,664,200
[45] Date of Patent: Sep. 2, 1997

[54] APPARATUS AND METHOD FOR PROVIDING MORE EFFECTIVE REITERATIONS OF INTERRUPT REQUESTS IN A MULTIPROCESSOR SYSTEM

[75] Inventors: George J. Barlow, Tewksbury, Mass.; James W. Keeley, Hollis, N.H.

[73] Assignee: Bull HN Information Systems Inc., Billerica, Mass.

[21] Appl. No.: 414,983

[22] Filed: Mar. 31, 1995

Related U.S. Application Data

[63] Continuation-in-part of Ser. No. 781,524, Oct. 22, 1991, Pat. No. 5,404,535.

[51] Int. Cl.$^6$ .................. G06F 13/24; G06F 13/18
[52] U.S. Cl. .................. 395/741; 395/736; 395/737
[58] Field of Search .................. 395/733–742

[56] References Cited

U.S. PATENT DOCUMENTS

| | | | |
|---|---|---|---|
| 4,231,086 | 10/1980 | Tarbox et al. | 364/200 |
| 4,769,768 | 9/1988 | Bomba et al. | 364/200 |
| 4,831,518 | 5/1989 | Yu et al. | 364/200 |
| 4,953,072 | 8/1990 | Williams | 364/200 |
| 5,027,271 | 6/1991 | Curley et al. | 364/200 |
| 5,109,513 | 4/1992 | Otsuka | 395/725 |
| 5,125,096 | 6/1992 | Brantley, Jr. et al. | 395/800 |
| 5,133,056 | 7/1992 | Miyamori | 395/275 |
| 5,146,597 | 9/1992 | Williams | 395/725 |
| 5,155,858 | 10/1992 | DeBruler et al. | 395/800 |
| 5,185,864 | 2/1993 | Bonevento et al. | 395/275 |
| 5,404,535 | 4/1995 | Barlow et al. | 395/737 |

FOREIGN PATENT DOCUMENTS

1-99163  4/1989  Japan .

*Primary Examiner*—Jack B. Harvey
*Assistant Examiner*—Jigar Pancholi
*Attorney, Agent, or Firm*—Faith F. Driscoll; John S. Solakian

[57] ABSTRACT

A multiprocessor computer system includes a number of processors, each processor having an interrupt mechanism and connecting in common to a system bus over which interrupt requests are communicated. When a processor accepts an interrupt request from another processor, it generates an acknowledge response on the system bus. If such processor contains a previous and pending interrupt request of an equal or higher priority level, it generates a not acknowledge response on the system bus and refuses the interrupt request. At the completion of servicing an interrupt request, each processor places on the system bus, an interrupt completed command including an address identifying such processor, a code designating a priority level to which it has switched and a code indicating that the processor has completing servicing an interrupt request. Each interrupt mechanism further includes interrupt retry means containing a refused interrupt register means for storing the channel address of the processor generating the not acknowledge in response and the priority level code contained in the interrupt request, and a level monitor logic unit connected to the system bus. The level monitor logic unit detects interrupt completed commands and compares the channel address and priority level code in the interrupt completed command to channel address and level code stored in the refused interrupt register means. When the processor channel addresses match and the level code is less than the level stored in the refused interrupt register means, the monitor logic unit generates a retry interrupt output. The processor retries the corresponding previously refused interrupt request upon receipt of the retry interrupt output.

15 Claims, 4 Drawing Sheets

APPARATUS AND METHOD FOR PROVIDING MORE EFFECTIVE REITERATIONS OF INTERRUPT REQUESTS IN A MULTIPROCESSOR SYSTEM

This application is a Continuation-in-Part of patent application Ser. No. 07/781,524, filed on Oct. 22, 1991 U.S. Pat. No. 5,404,535.

RELATED APPLICATIONS

The patent application entitled, "Apparatus for Marriage of Interrupt Mechanisms Between Different Types of Processors in a Single System" invented by James W. Keeley, Richard A. Lemay, Thomas S. Hirsch, John L. Curley and Bruno DiPlacido, Jr., Ser. No. 07/780,686, filed on Oct. 18, 1991 which became abandoned on Sep. 30, 1994.

BACKGROUND OF THE INVENTION

1. Field of Use

The present invention relates to the cooperative operation of multiple processors in a single system and, more particularly, to a means for reducing the number of interrupt retry attempts between processors of a multiprocessor system.

2. Prior Art

A recurring problem in present computer systems arises from the need to combine the various processors of a multiprocessor system into a cooperative system, and in particular, the need to integrate communications between the processors of a multiprocessor system.

This problem frequently occurs in coordinating the operations of the interrupt mechanisms of the processors of the system. As is well known, "interrupts" are a primary means of communication between the elements of most computer systems, wherein one element of the system, such as a processor may send a request, referred to as an "interrupt", to another element of the system, such as another processor, requesting that the other processor perform some operation for the requesting element or for notifying the other processor of an event requiring attention. Interrupts are commonly assigned priority levels and, if the processor receiving the interrupt is executing an operation or servicing an interrupt of lower priority level than the interrupt, the receiving processor will suspend, or interrupt, the current operation and perform the action requested by the interrupt.

If, however, the receiving processor is servicing an interrupt of the same or a high priority than the new interrupt request, the new request will be denied, commonly referred to as "not acknowledged". This requires that the requesting processor repeat the request for the interrupt at a later time, and generally continue to repeat the interrupt request until the request is accepted. This repetition of interrupt requests until acceptance, however, can consume substantial mounts of processor and system bus resources which are urgently needed for actual operations.

This problem arises both in a multiprocessor system using a single type of processor and, even more acutely, systems using different types of processor units to allow the system to perform a wider range of operations than may be achieved through a system using a single type of processor or to increase the performance of the system by adding faster and more powerful processors or processors providing special capabilities. An example of one such system is disclosed in U.S. Pat. No. 5,283,870 to Thomas Joyce and James W. Keeley entitled, "Method and Apparatus for Avoiding Processor Deadly Embrace in a Multiprocessor System" which issued on Feb. 1, 1994.

It is also well known, and a further problem in interrupt communication between processors, that different types of processors frequently recognize and use different types, numbers and levels of interrupts, so that communications between, for example, a processor designed for a proprietary system such as a DPS 6000 and a processor such as the Intel 80486, can be more difficult.

Additionally, in the above discussed multiprocessor systems, it is important that each processor be able to communicate interrupt requests to other processors within the system in the most efficient manner. Generally, there are three basic reasons for a processor generating an interrupt. One reason is that the processor is calling itself to change priority level to service a more important task. Another reason is that another processor is generating a "solicited" interrupt notifying the processor attempted to be interrupted of the completion of a previously requested task. The last reason is a processor generates an "unsolicited" interrupt request to notify another processor of the occurrence an important event. Such an event could be the detection of a change in state of a mechanical device, environmental sensor or power fail device resulting in the generation of an unsolicited interrupt.

In these cases, it is most important that such interrupts be prioritized in order to ensure that they are processed in the most efficient manner. For example, unsolicited interrupt requests generally would be assigned the highest priorities so that they receive immediate attention. It can be seen that where a processor is generating an interrupt for calling itself, this operation may preclude the servicing of higher priority interrupts. Therefore, it is important to take into account the servicing of different types of interrupts within a multiprocessor system which are assigned different priorities.

It is therefore an object of the present invention to provide an efficient way of having the processors of a multiprocessor system respond to the different types of interrupt requests received from each other.

SUMMARY OF THE INVENTION

The present invention is directed to a multiprocessor system which has a plurality of processors, each processor having an interrupt mechanism and each processor being connected in common to a system bus over which interrupt requests are communicated between processors. Each interrupt request includes a first channel number identifying the processor which is the source of the request, a second channel number identifying the processor which is the destination of the request, and a code identifying the level of the interrupt request.

When a first processor accepts an interrupt request from a second processor, the first processor via its interrupt generates an acknowledge response on the system bus. If the second processor contains a previous pending request or is processing an interrupt request of the same or higher priority level, the second processor generates a not acknowledge response on the system bus. At the completion of servicing an interrupt request, the second processor via its interrupt mechanism places an interrupt completed command on the system bus. The interrupt completed includes a channel address identifying the second processor, a code designating the priority level to which it has switched and a code indicating that the processor has completed servicing an interrupt request.

Each interrupt mechanism further includes interrupt retry means which operatively couples to the system bus. The interrupt retry means includes a refused interrupt register means for storing the channel number of a second processor and the priority level code contained in a refused interrupt request in response to a not acknowledge response from such second. Also, the retry means includes a level monitor logic unit which detects the occurrence of an interrupt completed command on the system bus and compares the channel address and priority level code contained in the interrupt completed command to a second processor channel address identification and priority level code stored in the refused interrupt register means. When the channel address in the interrupt completed command corresponds to the processor channel address stored in the refused interrupt register and the priority level code in the interrupt completed command is less than the priority level code stored in the refused interrupt register means, the monitor logic unit generates a retry interrupt output. The first processor in response to such interrupt retry output retries the corresponding previously refused interrupt request by again applying the interrupt request to the system bus. Since the interrupt request is of a higher priority than that of the first processor, it will be most likely accepted.

By only having a processor retry a previously refused interrupt request when the level of the interrupt request has a priority which is higher than that of the processor attempted to be interrupted, this eliminates having to retry interrupt requests which are unlikely to be accepted. This has a particular advantage where a processor makes changes in its priority level by making calls to itself. In such cases, a match of channel numbers will always occur but the added level requirement will operate to filter out interrupt requests which need not be retried. The present invention also facilitates the efficient processing of high priority unsolicited interrupt requests in that processors can now give greater attention to processing these requests.

The foregoing and other objects, features and advantages of the present invention will be apparent from the following description of the invention and embodiments thereof, as illustrated in the accompanying drawings.

DESCRIPTION OF PREFERRED
EMBODIMENTS

The following first describes a means for interfacing the interrupt mechanism of one type of processor such as a very high performance processor to that of another type of processor when the interrupt mechanisms of the two types of processors which recognize and use different types, numbers and levels of interrupts. It will be recognized by those of ordinary skill in the art that such interrupt interfacing may be added to any or all of the processors in a multiprocessor-type processor system notwithstanding their performance characteristics.

Next described is the apparatus of the present invention for reducing the reiteration of interrupt requests from one processor to another processor when an initial interrupt request by the requesting processor has been refused by the recipient processor. As described herein, the apparatus of the present invention may be used in connection with various types of interrupt mechanisms.

Figure 1:
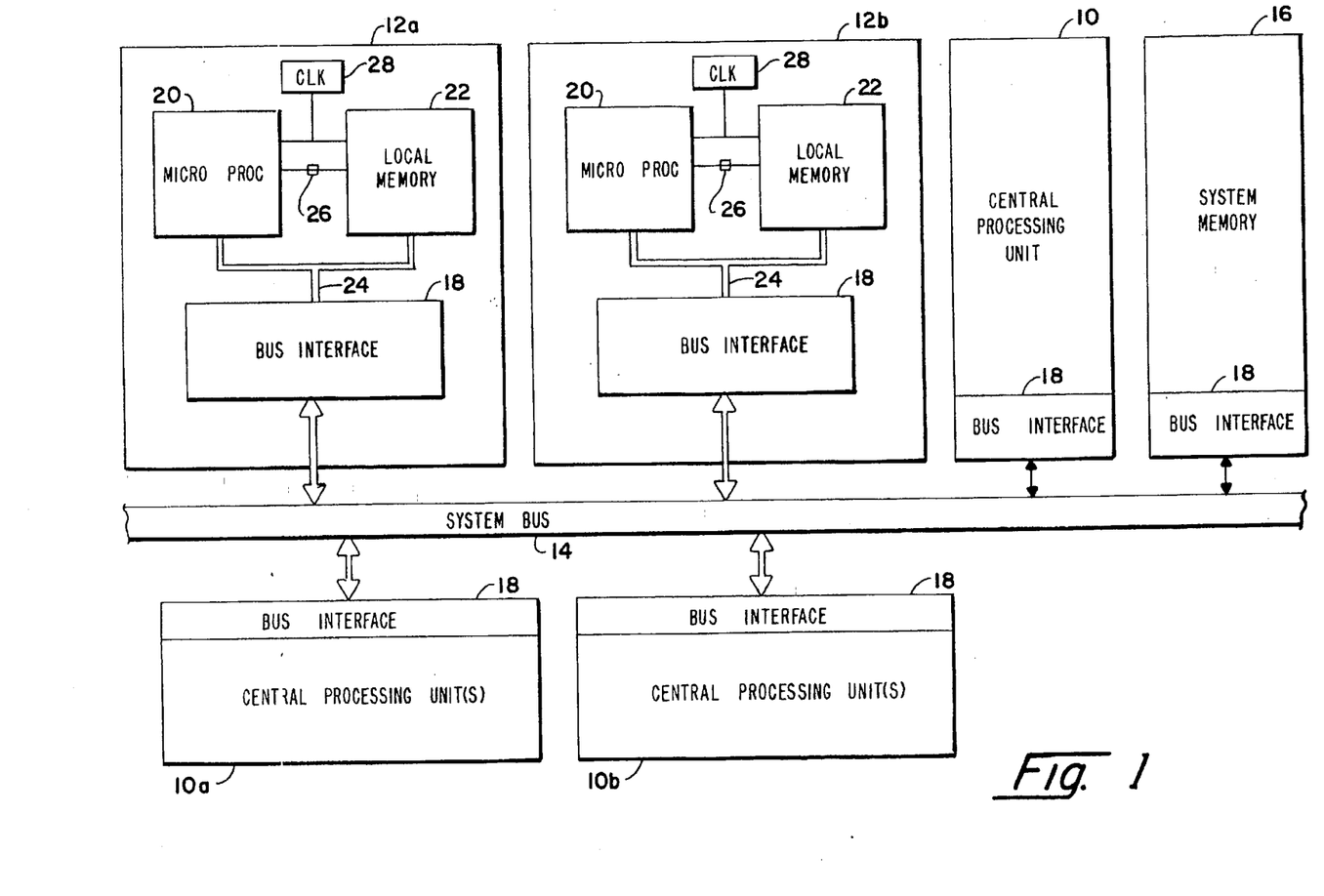
FIG. 1 is a block diagram of a multiprocessor system which incorporates the concepts of the present invention.

Multiprocessor System of FIG. 1

Referring to FIG. 1, therein is shown a multiprocessor system which includes a plurality of Central Processing Units 10a through 10x and peer Processors 12a and 12b which tightly couple in common to a System Bus 14 and to a Main, or System, Memory 16. Each Processor 10 and 12, as shown, includes a Bus Interface 18 which enables the unit to transmit or receive requests in the form of commands, interrupts, data or responses/status to another unit on System Bus 14. In the preferred embodiment, System Bus 14 operates asynchronously and uses a split bus cycle protocol which provides higher performance by granting other units bus cycles during the period of time a unit is waiting for main memory to furnish data in response to an earlier request made by that unit. In the present implementation, System Bus 14 is, for example, a MEGABUS* synchronous system bus. For further information regarding this type of bus interface and operation, reference may be made to U.S. Pat. No. 3,997,896.

*MEGABUS is a trademark of Bull HN Information System Inc.

Referring to FIG. 1, it is seen that each peer Processor 12 includes a Microprocessor 20, a Local Memory 22 and Interface Buses 24 which couple to Bus Interface circuits 18, as shown. Microprocessor 20 and Local Memory 22 are tightly coupled through a Local Processor Bus 26 and operate under control of clock inputs provided by a Clock Circuit (CLK) 28. Microprocessor 20 is a high performance 32-bit processor which operates at dock speeds of up to 33 MHz and in the preferred embodiment corresponds to an Intel 80486 chip.

The Intel 80486 chip includes a microprocessor, a floating-point math coprocessor, a memory cache controller and an 8K RAM cache unit. The principal processing function is performed by the microprocessor while complex processing functions, such as floating operations, are performed by the math coprocessor. The internal cache unit provides fast access to the data required for processing. In the preferred embodiment, peer processors 12 operate under the control of a UNIX** operating system.

**UNIX is a registered trademark in the United States and other countries, licensed exclusively through X/Open Company Limited.

In the system of FIG. 1, Central Processing Units 10 function as host processors. In the preferred embodiment, each processor takes the form of a Bull DPS6000 system which operates under the control of the Bull HVS proprietary operating system. Each of the processors are organized to operate in an independent manner and have access to the full complement of system resources, such as input/output units, main memory and the like.

Figure 2:
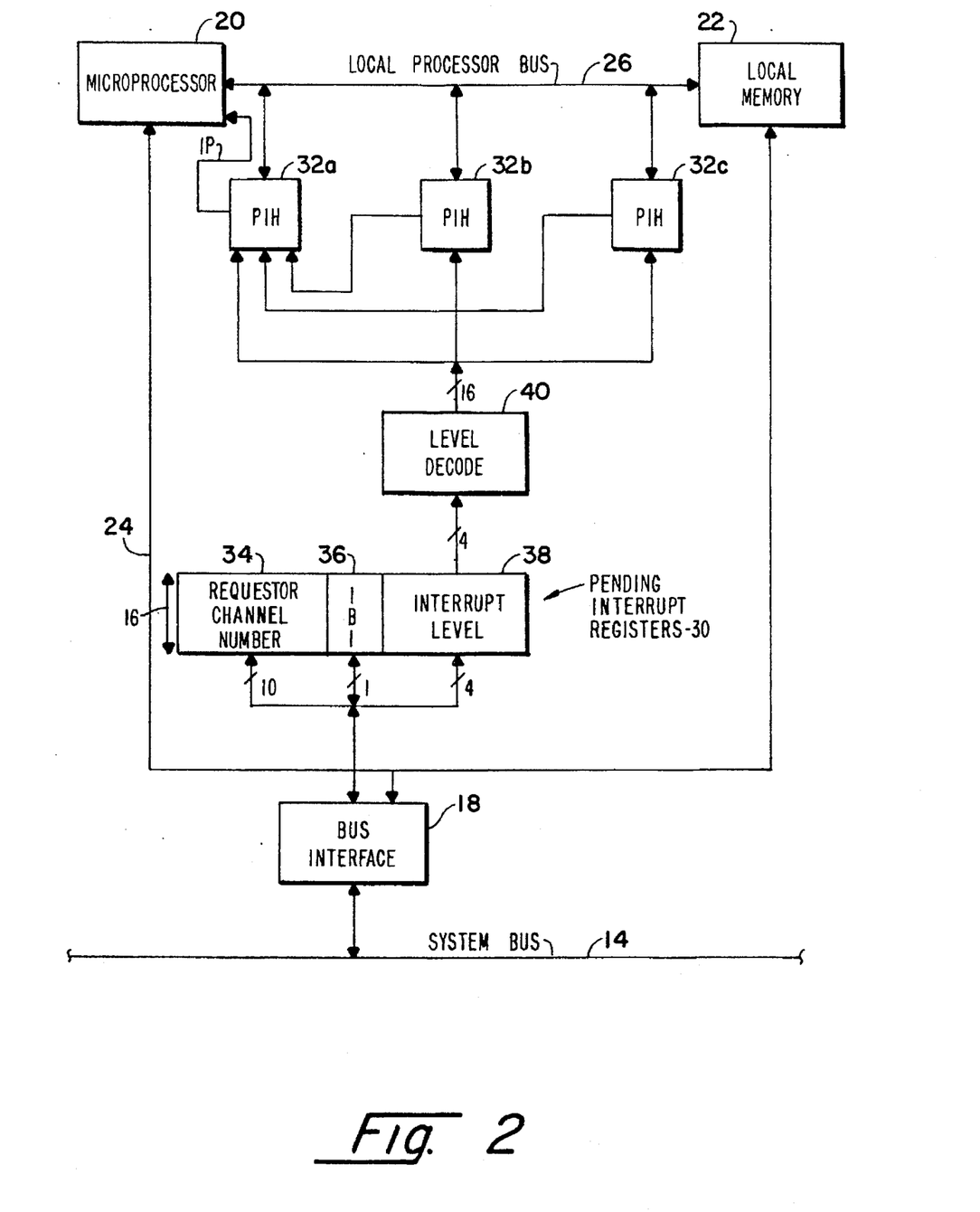
FIG. 2 is a block diagram of processor with logic used for interfacing the interrupt mechanisms of the various processors of the system of FIG. 1.

Processor 12-FIG. 2

Shown in FIG. 2 is a block diagram of a Processor 12 with the logic of the present invention for interfacing the interrupt mechanisms of Processors 12 with the interrupt mechanisms of Central Processing Units 10, System Bus 14 and the other devices and elements of the System to form a single, cooperative system. It will be understood in the discussions herein that the term "processor" refers to any Processor 10 or 12 connected from and having access to System Bus 14 and that the interrupt interface mechanism operations and apparatus described herein may be used and operate between any two or more "processors" in the system, or even for interrupts of a "processor" by itself, so that any processors of the system may be the "first" and "second" processors described herein.

As shown, the interrupt interfacing logic circuits include Pending Interrupt Registers 30, bidirectionally connected from the Processor 12's Bus Interface 18 and a set of Priority Interrupt Handlers (PIHs) 32a through 32c, connected from outputs of Pending Interrupt Registers 30 and chained together with a final Interrupt Output (INT) to Microprocessor 20. PIHs 32 are also bidirectionally connected to Local Processor Bus 26. In the present implementation, described below as handling 16 levels of interrupts, PIHs 32 are comprised of Intel 8259 Priority Interrupt Handlers, which are described in the Intel Microsystem Components Handbook, Microprocessors, Volume 1, ISBN 1-555-12-001-6.

Referring first to Pending Interrupt Registers 30, Pending Interrupt Registers 30 are provided to receive and store interrupt requests received by a Processor 12 from another processor or element of the system through System Bus 14 and the Processor 12's Bus Interface 18. Pending Interrupt Registers 30 are essentially comprised of a bank of registers, the bank containing one register for each level of interrupt to be recognized and serviced by the Processor 12's Microprocessor 20.

Each register of Pending Interrupt Registers 30 is assigned to a corresponding interrupt level and is used to store any interrupt received which is of the corresponding level. In the present implementation, 16 of the possible interrupt levels in the portion of the system comprised of Central Processing Units 10, system Memory 16, System Bus 14 and the devices and peripheral devices designed for use with System Bus 14 have been selected to be handled and serviced by the Processors 12 so that Pending Interrupt Registers 30 correspondingly contain 16 registers.

In other systems of in other implementations of the exemplary system described herein, more or fewer than 16 levels of interrupt may be chosen for servicing by Processors 12, with corresponding changes, which will be obvious to those of ordinary skill in the art, in the number of registers in Pending Interrupt Registers 30 and, as discussed further below, the number of interrupt levels handled by PIHs 32. Also, the interrupt logic unit disclosed in U.S. Pat. No. 4,839,800 invented by George J. Barlow and James W. Keeley entitled, "Data Processing System with a Fast Interrupt" which issued on Jun. 13, 1989 may be utilized. This unit which utilizes two levels of interrupt request storage is similar to the type of interrupt units normally included in processors 10a and 10b of FIG. 1.

As has been briefly described above and as is described in greater detail in the above referenced U.S. Pat. No. 3,997,896, any processor or device in the system which is designed for use with System Bus 14 may make an interrupt request of any other device or processor connected to System Bus 14 by placing an interrupt request on System Bus 14. Each interrupt request is essentially comprised of a number or address, often referred to as a channel number, identifying the device or processor to receive the request, a number of address identifying the source of the request, and a code identifying the request as an interrupt request and the level of the interrupt.

The Bus Interface 18 of the intended recipient of the interrupt request recognizes the interrupt request and itself as the intended recipient and reads the request from System Bus 14. In the instance when the intended recipient is a Processor 12, the interrupt request is written into Pending Interrupt Registers 30 as described below.

As shown, Pending Interrupt Registers 30 are comprised of a bank of registers, with one register for each level of interrupt to be handled by Processors 12. Each register stores a Requestor Channel Number field 34 containing the channel number identifying the source of an interrupt request, an Interrupt Busy Indicator field 36 containing a bit indicating whether the particular register presently contains a previously received and pending interrupt request at the level assigned to the register which has not yet been processed and an Interrupt level field 38 containing a number representing the level of the corresponding interrupt.

In the present implementation, Channel Number field 34 is a ten bit field and thus may identify up to $2^{10}$ individual processors or devices in the system. The Interrupt Level field 38 is a four bit field and thus able to identify up to 16 different interrupt levels.

Upon receiving an interrupt request, the Bus Interface 18 of a Processor 12 first determines the level of the received interrupt to determine whether the level of the received interrupt corresponds to an interrupt level selected to be handled by the Processor 12. If the interrupt level does not correspond to one of the selected interrupt levels, the Bus Interface 18 responds to the interrupt request by returning a Not Acknowledge (NAK) response on System Bus 14 to the source of the request.

If the interrupt request corresponds to one of the selected interrupt levels, Bus Interface 18 reads the Interrupt Busy Indicator Field 36 of the register assigned to the level of the received interrupt. If the Interrupt Busy Indicator Field 36 bit indicates that there is no previously received pending interrupt at that level, the Bus Interface 18 writes the channel number of the interrupt requestor and the level number of the request respectively, into the Channel Number field 34 and the Interrupt Level Field 38 of the corresponding register of Pending Interrupt Registers 30, and sends an Acknowledge (ACK) response to the requestor that the interrupt request has been received and accepted.

If the Interrupt Busy Indicator Field 36 bit indicates that there is a previously received interrupt request at that level which is still pending, Bus Interface 18 and Pending Interrupt Registers 30 does not accept the new interrupt request at that level, and Bus interface 18 sends a Not Acknowledge (NAK) response to the requestor indicating that the interrupt is not accepted. The interrupt requestor may then resubmit the interrupt request at a later time.

Lastly, a Level Decode Logic unit 40 is connected from the four bit outputs of the Interrupt Level Fields 38 of Pending Interrupt Registers 30. Level Decode Logic unit 40 receives the four bit interrupt level codes into a corresponding 16 single bit outputs which are provided to the inputs of PIHs 32. Each single bit output line of Level Decode Logic 40 corresponds to one of the assigned interrupt levels and an active level on any one or more of the output lines of Level Decode Logic unit 40 indicates that Pending Interrupt Registers 30 presently contains a pending interrupt request at the corresponding interrupt level.

The outputs of the Level Decode Logic unit 40 are connected to inputs of PIHs 32a through 32c according to the levels represented by the outputs of Level Decode Logic unit 40 and according to the rules described in Intel Microsystem Components Handbook, Microprocessors, Volume 1, ISBN 1-555-12-001-6. As indicated, PIHs 32b and 32c are connected as slave units to PIH 32a which serves as the master priority interrupt handler unit. The interrupt signal output of PIH 32a (INT) is connected to the interrupt input of Microprocessor 20.

The presence of an interrupt request stored in any of Pending Interrupt Registers 30 results in an interrupt signal input into Microprocessor 20. Microprocessor 20 responds to an interrupt signal input by interrogating PIHs 32 through Local Processor Bus 26. The PIHs 32 respond by providing Microprocessor 20 with an indication of the particular highest priority PIH 32 input line having an active input from Level Decode Logic unit 40. From that information, Microprocessor 20 may read from the corresponding register in Pending Interrupt Registers 30, the Requestor Channel Number Field 34 of the register corresponding to the highest priority level interrupt then stored in Pending Interrupt Registers 30 and thus obtain the identity of the source of that interrupt request, and service the interrupt request accordingly.

While Microprocessor 20 may, in some implementations of the system, read information directly from Pending Interrupt Registers 30, the present implementation of Pending Interrupt Registers 30 and Bus Interface 18 prefers to use an indirect access to Pending interrupt Registers 30 in order to take advantage of the existing design of the Bus Interface 18 and to provide inherent serialization of operations, thereby avoiding possible race conditions. That is, Microprocessor 20, upon receiving an indication of a pending interrupt stored in Pending Interrupt Registers 30 and the identity of the register containing the highest level interrupt, issues a read Pending Interrupt Register request to itself, that is, to the Microprocessor 20 of Processor 12 through Bus Interface 18 and onto System Bus 14. The Bus Interface 18 of the Processor 12 detects the read request issued to itself, and responds by reading the requested contents of Pending Interrupt Registers 30 onto System Bus 14. The Bus Interface 18 then reads the response place on System Bus 14 by itself and transfers the requested information from System Bus 14 to the Microprocessor 20.

Figure 3:
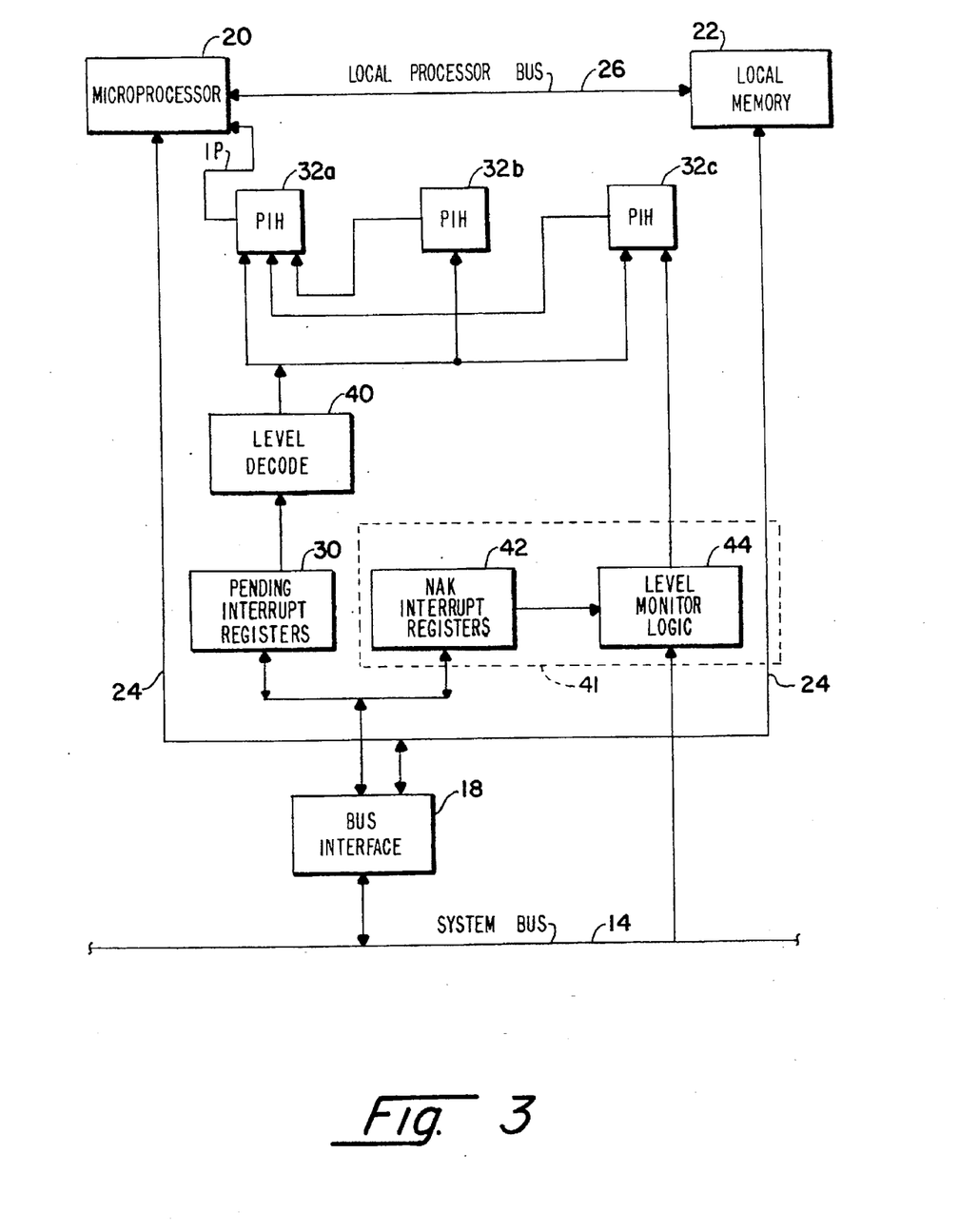
FIG. 3 is a block diagram of a processor with logic for coordinating interrupt operations between processors and, in particular, for determining when a processor may retry a refused interrupt request.

FIG. 3

Referring now to FIG. 3, there is shown a block diagram of a Processor 12 with the addition of the apparatus of the present invention contained in block 41 for reducing the reiteration of interrupt requests from one processor to another processor when an initial interrupt request by the requesting processor has been refused by the recipient processor. Again, it will be recognized by those of ordinary skill in the art that the interrupt retry logic shown and described herein may be added to any processor or processors of the system and that, again, any processors of the system may be the "first" and "second" processors described herein. In the following discussion, the term "first" processor is used to indicate a processor which is making an interrupt request to another processor of the system, which is referred to in the following discussion as the "second" processor.

As was previously described, a first processor of the system, such as a Processor 10 or 12 may make an interrupt request to a second processor of the system, such as a second Processor 10 or 12 through System Bus 14. In the example discussed herein, the Processor 12 may initiate the request for an interrupt and transmit this request to its associated Bus Interface 18 which then generates and place on System Bus 14 the corresponding interrupt request.

Also, as has been described, each interrupt request is essentially comprised of a number or address, often referred to as a channel number, identifying the device or processor to receive the request, a number or address identifying the source of the request, and a code identifying the request as an interrupt request and the level of the interrupt.

The Bus Interface 18 of the second processor which is identified in the request as the recipient of the interrupt request detects and receives the interrupt request from System Bus 14. If the second processor accepts the interrupt request, the second processor acknowledges acceptance of the request by placing an "acknowledge" (ACK) response on System Bus 14, and this response is received from System Bus 14 by the first processor. If the second processor cannot accept the interrupt request, however, for example, when the second processor is servicing a previously received interrupt request of the same or higher priority level, the second processor refuses to accept the interrupt request and indicates this refusal by placing a "not acknowledge" (NAK) response on System Bus 14. ACK and NAK responses are generally similar in format to an interrupt request, but contain ACK and NAK codes in place of the field in an interrupt request which identifies the request as an interrupt request and the level of the interrupt.

In the event of a NAK response to an interrupt request, the first processor receives the NAK response from System 14 and responds by storing an identification of the second processor in a field or register in NAK Interrupt Register 42, and indicates to the second processor that the request has been refused at that time and must be resubmitted at a later time.

As indicated in FIG. 3, the retry apparatus of block 41 includes a plurality of NAK interrupt registers 42 and a level monitor logic unit 44. In the present implementation, the identification or address of the second processor stored in NAK Interrupt Register 42 is comprised of the channel number of the second processor or, as described further below, a portion of the channel number of the second processor along with the level code of the refused interrupt request.

Associated with NAK Interrupt Register 42 is Level Monitor Logic Unit 44 which is connected from System Bus 14 and monitors "level changes" of the processors connected from System Bus 14, that is, indications appearing on System Bus 14 that a given processor, such as the second processor which was the intended recipient of an interrupt request, has changed its "level" with respect to servicing interrupts.

Such "level changes" are issued during a bus cycle of operation which ensures the reliable switching between interrupt levels and the notification of such level changes to the other units of the system as described in U.S. Pat. No. 4,802,087 invented by James W. Keeley and George J. Barlow entitled, "Multiprocessor Level Change Synchronization Apparatus" which issued on Jan. 31, 1989. Accordingly, the level monitor logic unit 44 includes comparison logic circuits which take the form of the comparison circuits disclosed in referenced U.S. Pat. No. 4,802,087.

In this regard, as described above, Microprocessor 20 and Bus Interface 18 use an indirect access to Pending Interrupt Registers 30 in order to take advantage of the existing design of the Bus Interface 18 and to provide inherent serialization of operations, thereby avoiding possible race conditions. That is, Microprocessor 20, upon receiving an indication of a pending interrupt stored in Pending Interrupt Registers 30 and the identity of the register containing the highest level interrupt, issues a read Pending Interrupt Register request to itself, that is, to the Microprocessor 20 of Processor 12 through Bus Interface 18 and onto System Bus 14. The Bus Interface 18 of the Processor 12 detects the read request issued to itself, and responds by reading the requested contents of Pending Interrupt Registers 30 onto System Bus 14. The Bus Interface 18 reads the response place on System Bus 14 by itself and transfers the requested information from System Bus 14 to the Microprocessor 20.

Bus Interfaces 18 of all processors connected from System Bus 14 use a similar indirect access to the interrupt handling mechanisms of the processors for the same reasons and the result is that each processor, when completing the servicing of an interrupt, executes a sequence of one or more commands or requests to itself pertaining to the completion of the servicing of the interrupt through its Bus Interface 18 and, accordingly, System Bus. Such commands and requests generally pertain, for example, to the clearing of certain interrupt registers.

As a result, however, the interrupt servicing operations of a given processor results in one or more commands or requests appearing on System Bus 14 at the conclusion of the processor's servicing of any interrupt request that had been pending in that processor.

Level Monitor Logic unit 44 monitors the commands and addresses appearing on System Bus 14 for such interrupt related commands and requests from a processor to itself and compares the addresses, that is, the channel numbers and level numbers of such commands and requests to the channel numbers and level numbers stored in it associated NAK Interrupt Registers 42. The appearance of an end of interrupt completed related command or request on System Bus 14 by processor to itself which contains a channel number corresponding to a channel number stored in NAK Interrupt Registers 42 of a second processor which has previously refused an interrupt request from its processor, that is, has previously responded with a NAK response, indicates to Level Monitor Logic unit 44 that the second processor may have completed servicing of the higher level interrupt which caused the NAK response that the second processor may now be available to receive the previously submitted interrupt request from the first processor.

As described herein, to ensure the success of a subsequent retry operation, the apparatus of the present invention additionally performs a level comparison operation for determining priorities. More specifically, the retry apparatus determines if the level number contained in the same end of interrupt completed related command designates a priority which is less than the priority by the level number stored in the NAK Interrupt Registers 42 of the second processor which previously refused that interrupt request. Retries are only initiated when both the channel number and level number criteria are met.

Level Monitor Logic unit 44 indicates the occurrence of a interrupt complete command on System Bus 14 from a second processor to itself which corresponds to a channel number stored in NAK Interrupt Registers 42 and specifies a lower priority level by generating a Repeat Interrupt (RINT) signal to the interrupt handling logic unit of its associated processor. This is represented in FIG. 3 by the output RINT from Level Monitor Logic unit 44 to the PIHs 32 of the Processor 12.

The processor responds to the RINT input from Level Monitor Logic unit 44 by determining the identity of the processor corresponding to the interrupt complete command from NAK Interrupt Registers 42 and again generating the corresponding previous interrupt request onto System Bus 14 through Bus Interface 18. The previously described operations are performed once again. That is, the second processor may accept and service the request, as indicated by the second processor placing an ACK response on System Bus 14, or the second processor may once again refuse to accept the request and places a NAK response on System Bus 14. In this latter instance, the processor once again stores the channel number and level number of the refused interrupt request in NAK Interrupt Registers 42 and Level Monitor Logic unit 44 again monitors System Bus 14 for the occurrence of a interrupt complete command on System Bus 14 from a second processor to itself which corresponds to a channel number stored in NAK Interrupt Registers 42 and has a level number whose priority is less than the level number associated with the stored channel number.

Figure 4:
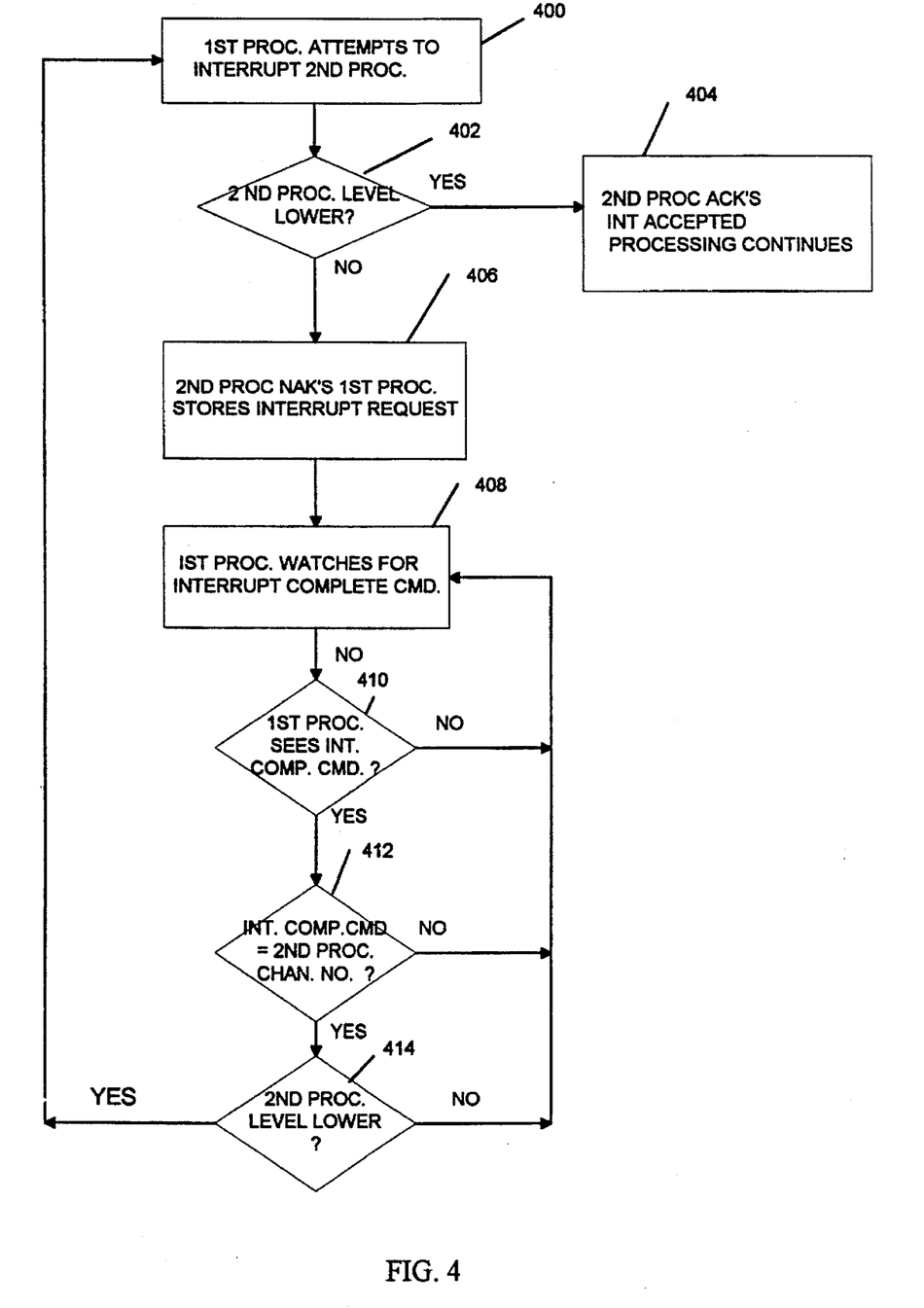
FIG. 4 is a flow diagram used in explaining the operation of the present invention.

FIG. 4

The flow diagram of FIG. 4 illustrates the overall sequence of operations for carrying out retry attempts by the interrupt retry logic apparatus of the present. As mentioned previously, the retry apparatus of the present invention may be used with various types of interrupt mechanisms. Therefore, for ease of explanation, it is assumed that the interrupt mechanism included within the first and second processors contains minimal storage such as the type of interrupt mechanism described in referenced U.S. Pat. No. 4,839,800.

Referring to FIG. 4, it is seen from block 400 that a first one of the processors of the multiprocessor system of FIG. 1 (i.e., first processor) attempts to interrupt a second one of the processors in FIG. 1 (i.e., second processor). This involves having the first processor place on system bus 14, an interrupt request containing the channel number of the second processor and the level number code. The second processor upon receipt of the interrupt request, compares the current level number stored within an internal level register to the level number code contained in the interrupt request of the interrupting first processor.

As indicated in block 402, when the second processor current level is lower than the level contained in the interrupt request, then the second processor sends an ACK response on system bus 14, accepts the request and begins processing the second processor interrupt as indicated in block 404. If the second processor current level is the same or higher than the level of the first processor interrupt request, then the second processor sends an NAK response on system bus 14 as indicated in block 406. Additionally, as indicated in block 406, the first processor in response to the NAK response, stores in an internal NAK interrupt register, such as one of the NAK interrupt registers 42, the refused interrupt request. More specifically, the first processor stores the channel number of the first processor which refused the interrupt request and the level number contained in the interrupt request. Such level number designates the priority of the event which prompted the first processor attempted interrupt. The priority is assigned as a function of the type of the event. In the case of an unsolicited event such as a power failure, the level would be assigned the highest priority (i.e., a zero value).

Next, as indicated by block 408, the first processor monitors system bus 14 via its level monitor logic unit 44 for the occurrence of an interrupt complete command indicating that the second processor has completed the processing of the interrupt and is initiating a "level change". When the first processor completes its processing of an interrupt, it applies the interrupt completed command to system bus 14 as indicated by block 410.

As shown in block 412, the first processor level monitor logic unit 44 compares the channel number of the interrupt completed command to the channel number of the refused interrupt request previously stored in the NAK interrupt register to determine if they are the same. If, they are not the same, the first processor resumes monitoring the system bus 14 for further interrupt completed commands. As indicated in block 414, when the channel numbers are the same, then the first processor compares the level number contained in the interrupt completed command with the level number of the refused interrupt request containing the channel number of the second processor. If the level number of the interrupt completed command is equal to or higher than the level number of the refused interrupt request, then the first processor resumes monitoring the system bus 14 for further interrupt completed commands.

As indicated in FIG. 4, when the level number of the interrupt completed command is lower than the level number of the refused interrupt request, then the first processor performs a retry of the original interrupt request (i.e., takes the retry path). This results in the previously refused interrupt request being again placed on system bus 14. Since the refused interrupt request was determined to have a higher priority than the level to which the second processor switched, this ensures that the refused interrupt request will be most likely accepted by the second processor.

The interrupt retry logic apparatus described above thereby reduces the number of interrupt retry attempts that a given processor need make when an interrupt request has been refused by initiating the retry of a previously refused interrupt request to those points in the operation of the destination processor and under those processing conditions (i.e., priorities) when the destination processor is most probably capable of accepting an interrupt request, that is, to those points when the destination processor has completed servicing of an interrupt and has switched to a level which has a priority lower than the priority of a previously refused interrupt request.

It should be noted that, in the present implementation, certain ranges of channel numbers are assigned to certain types of processors connected from System Bus 14, so that NAK Interrupt Registers 42 and Level Monitor Logic unit 44 need not store and monitor all bits of the channel numbers appearing on System Bus 14, but only certain of those bits, thereby reducing the number of bits stored in NAK Interrupt Registers 42 for each channel number and the number of address lines monitored by Level Monitor Logic unit 44. Further, it will be understood by those skilled in the art that the priorities of levels can be assigned in different ways and include designations of interrupt types or classes to the extent that this will expedite processing. Also, it will be appreciated by those skilled in the art that the retry apparatus of the present invention may be used with any type of processor notwithstanding its level of performance in order to minimize bus traffic. By including such apparatus in each processor, this will facilitate symmetrical operation.

While the invention has been particularly shown an described with reference to a preferred embodiment of the method and apparatus thereof, it will be understood by those of ordinary skill in the art that various changes in form, details and implementation may be made therein without departing from the spirit and scope of the invention as defined by the appended claims.

What is claimed is:

1. A multiprocessor system comprising a plurality of processors connected in common to a system bus for transferring interrupt requests and interrupt completed commands between different ones of said processors during bus cycles of operation, each interrupt request including a first processor identification code designating an interrupting processor, a second processor identification code designating which processor was attempted to be interrupted by one of the plurality of processors and a level number specifying the priority of the interrupt request, each interrupt completed command including the second processor identification code, a code indicating completion of processing an interrupt request by one of the plurality of processors and a level number specifying the level to which said second processor switched, each processor including an interrupt mechanism having response means connected to said system bus for generating acknowledge and not acknowledge responses respectively signaling acceptance and refusal of each interrupt request, a number of said plurality of processors including interrupt retry apparatus, the interrupt retry apparatus comprising:

a refused interrupt register means coupled to said system bus, said refused interrupt register means responsive to a not acknowledge response received from a processor attempted to be interrupted in response to an interrupt request issued by an interrupting processor for storing the second processor identification code and level number contained in the interrupt request; and, a level monitor unit connected to said system bus for detecting each occurrence of an interrupt completed command on the system bus, the level monitor unit being operatively connected to the refused interrupt register means and including comparison circuits for comparing the second processor identification code and level number in the interrupt completed command to the second processor identification code and level number stored in the refused interrupt register means; the level monitor unit generating an interrupt retry output signal to the interrupting processor only when the second processor identification code in the interrupt completed command identically matches the second processor identification code stored in the refused interrupt register means and the level number in the interrupt completed command has a predetermined value relative to the level number stored in the refused interrupt register means, the interrupting processor in response to the interrupt retry output signal reapplying the previously refused interrupt request to the system bus for acceptance by the processor previously attempted to be interrupted.

2. The multiprocessor system of claim 1 wherein the predetermined value is less than the level number stored in the refused interrupt register means.

3. The multiprocessor system of claim 2 wherein the value denotes that the refused interrupt request has a priority which is higher than the task being processed by the processor attempted to be interrupted.

4. The multiprocessor system of claim 1 wherein the first and second processor identification codes correspond to previously assigned channel numbers.

5. The multiprocessor system of claim 1 wherein said number of said plurality of processors including said interrupt retry apparatus are high performance processing units, each containing a high performance microprocessor.

6. The multiprocessor system of claim 5 wherein the number of the plurality of processor includes all of the plurality of processors.

7. The multiprocessor system of claim 1 wherein the interrupt request generated by the interrupting processor corresponds to any one of a predetermined number of different types of interrupt requests.

8. The multiprocessor system of claim 7 wherein the number of different types of interrupt requests includes a self interrupt, a solicited interrupt and an unsolicited interrupt.

9. The multiprocessor system of claim 8 wherein the self interrupt is generated by any one of the number of processors for causing a level change to process a higher priority task.

10. The multiprocessor system of claim 8 wherein the solicited interrupt is generated by a first one of the number of processors for notifying a second one of the number of processors of having completed a task previously assigned by the second one of the number of processors.

11. The multiprocessor system of claim 8 wherein the unsolicited interrupt is generated by a first one of the number of processors for notifying a second one of the number of processors of an occurrence of a system event.

12. The multiprocessor system of claim 11 wherein the system event includes a power failure, environmental state change and a mechanical state change requiring servicing.

13. A method for providing more effective reiterations of interrupt requests in a multiprocessor system comprising a plurality of processors tightly coupled to a system bus for transferring requests between processors during one or more bus cycles of operation, the requests including interrupt requests and interrupt completed commands, each interrupt request including a first processor identification code designating an interrupting processor, a second processor identification code designating which processor was attempted to be interrupted by one of the plurality of processors and a level number specifying the priority of the interrupt request, each interrupt completed command including the second processor identification code, a code indicating completion of processing an interrupt request by one of the plurality of processors and a level number specifying the level to which said second processor switched, each processor including an interrupt mechanism having response means connected to said system bus for generating acknowledge and not acknowledge responses respectively signaling acceptance and refusal of each interrupt request, the method comprising the steps of:

adding retry apparatus to each processor of a number of said plurality of processors, the retry apparatus including a refused interrupt register means and a level monitor unit coupled to the refused interrupt register means and the refused interrupt register means and level monitor unit, each being coupled to the system bus;

storing the second processor identification code and level number of an interrupt request issued by each processor in the refused interrupt register means of the interrupting processor in response to a not acknowledge response received from a processor attempted to be interrupted by each interrupting processor;

detecting each occurrence of an interrupt completed command on the system bus by the level monitor unit of each interrupting processor;

comparing the second processor identification code and level number in the interrupt completed command to the second processor identification code and level number stored in the refused interrupt register means by the monitor level unit of each interrupting processor;

generating an interrupt retry output signal by the monitor level unit of each interrupting processor to the interrupting processor only when the second processor identification code in the interrupt completed command identically matches the second processor identification code stored in the refused interrupt register means and the level number in the interrupt completed command has a predetermined value relative to the level number stored in the refused interrupt register means; and, reapplying the previously refused interrupt request to the system bus by the interrupting processor in response to the interrupt retry output signal for acceptance by the processor which was previously attempted to be interrupted by the interrupting processor.

14. The method of claim 13 wherein the predetermined value is less than the level number stored in the refused interrupt register means of the interrupting processor.

15. The method of claim 13 wherein the step of adding retry apparatus to each processor of a number of the plurality of processors involves adding retry apparatus to each processor of the plurality of processors.

* * * * *